Patented July 16, 1935

2,008,649

UNITED STATES PATENT OFFICE 2,008,649

ALIPHATIC POLY-AMIDES AND PROCESS FOR THEIR PREPARATION

Heinrich Ulrich and Joseph Nuesslein, Ludwigshafen-on-the-Rhine, Germany, assignors to I. G. Farbenindustrie Aktiengesellschaft, Frankfort-on-the-Main, Germany No Drawing. Application May 11, 1931, Serial No. 536,650. In Germany May 17, 1930

19 Claims. (Cl. 260—124)

The present invention relates to the production of wetting, cleansing, dispersing and like agents.

It has already been proposed to condense partially alkylated alkylene diamines with fatty acids, or their halides or anhydrides.

We have now found that valuable wetting, cleansing and dispersing agents can be obtained by condensing aliphatic poly-amino compounds which contain more than two nitrogen atoms in the molecule and which have at least one reactive hydrogen atom attached to a nitrogen atom, but are free from alkylol groups, i. e., amines or their derivatives or substitution products according to the beforementioned definition, with higher organic acids containing at least six carbon atoms and at least one double linkage and/or hydroxyl group, i. e., carboxylic acids, sulphonic acids or sulphonic carboxylic acids of the aliphatic, cycloaliphatic, aliphatic-aromatic or aromatic series, the resulting amides being sulphonated if they do not contain any sulphuric acid radicle, either in the form of the sulphonic acid radicle or in the form of the sulphuric ester group, or if further sulphonation be desired. When sulphuric acid, sulphur trioxide, oleum or chlorsulphonic acid be employed for the said aftertreatment sulphonic acids or sulphuric esters may be obtained. The amines must be free from alkylol groups since, otherwise, esters and no amides may be formed.

Diethylene triamine, diethylene tetramine, hexamethylene tetramine, diamino pyridine and the like may for example be employed for the condensation. The acids employed for the condensation may be chosen from higher mono- or di-basic organic acids containing at least one double linkage and/or hydroxyl group, such as the higher fatty acids, as for example hydroxy stearic, oleic or ricinoleic acid or other similar acids of vegetal, i. e., animal or vegetable origin or naphthenic or phthalic acids, aromatic monoor poly-basic acids, sulphonic acids of organic compounds, such as the sulphonic acids of aliphatic compounds or of aromatic, hydroaromatic or heterocyclic compounds, as for example naphthalene sulphonic acids, preferably of polynuclear compounds which contain one or more aliphatic side-chains as for example butylnaphthalene sulphonic acids. Instead of the free acids, their anhydrides, halides or esters can be employed which under the conditions of working may react like the free acids and give the same condensation products with the amines. For the sake of brevity the aforesaid acids and their derivatives, reacting like the acids, will be referred to in the following as higher organic acids. The manner of production of several of the condensation products will be explicitly illustrated below by way of examples though the methods of producing them follow the usual lines of converting an amine into an amide.

The temperature employed for condensation is usually above 80° C., but in most cases a temperature above 100° C., is applied in order to accelerate the reaction, which may be further accelerated by adding a condensing agent, such as is usual for such reactions in the organic chemistry, for example zinc chloride. If the treatment of the amide with the acids is performed at a low temperature, say at about room temperature, or up to about 50° or 60° C., a salt of the said compounds is first obtained which can be converted into the amide by heating whereby water is split off. In the condensation products which still contain a reactive hydrogen atom connected with a nitrogen atom the said hydrogen atom may be substituted by an alkyl group in the usual manner of alkylating amines as for example with the aid of dimethyl sulphate or an alkylene oxide or glycol chlorhydrin.

The subsequent sulphonation may be carried out for example by introducing the amide which is free from or contains an insufficient number of sulphonic and/or sulphuric ester groups, into an at least double quantity of concentrated sulphuric acid at a temperature of from 5° to 25° C. Instead of sulphuric acid, chlorsulphonic acid, sulphur trioxide or oleum may be employed, the reaction with chlorsulphonic acid being preferably carried out in the presence of inert organic diluents such as ethylene chloride, carbon tetrachloride or ethyl ether, especially if the sulphonation is to be carried out under particularly mild conditions.

In many cases the usefulness of the products obtained for the purposes hereinbefore described is increased in their application by the addition of another dispersing agent, such as known in the art as wetting agents, for example soaps or substances of a saponaceous nature, such as saponines, cholates, synthetic wetting agents and the like, or protective colloids, such as animal or vegetable glues, or gums, gelatine, or sulphite cellulose waste liquor and the like, or organic solvents, or several of these substances. By means of the said products in particular even organic solvents can be dissolved or emulsified in water to a considerable extent and products are thus obtained which are excellently suitable, for example, for wetting, cleansing, washing, bleaching and dyeing textiles, even for use in acid dye baths, and for emulsifying and dispersing other substances according to the requirements in the textile, leather or lacquer and varnish industries.

The following examples will further illustrate the nature of this invention but the invention is not restricted to these examples.

*Example 1*

Equimolecular proportions of diethylene triamine and of oleic acid are heated for 4 hours to about 170° C. The resulting basic amide is introduced at about 30° C. into 4 times its weight of concentrated sulphuric acid whereby a water-soluble sulphuric ester is obtained which may be employed for example as a cleansing or washing agent.

*Example 2*

1 molecular proportion of triethylene tetramine is heated with 1 molecular proportion of oleic acid and 2 molecular proportions of stearic acid for 4 hours to 180° C.

100 parts of the amide are dissolved in 500 parts of ethyl ether and 100 parts of chlorsulphonic acid are added at from 20° to 30° C. A water-soluble sulphonic acid is obtained after some time which is especially suitable as a washing and scouring agent.

An analogous product can be obtained by sulphonating an amide obtained by heating 100 parts of olive oil and 25 parts of di-ethylene triamine to 180° C., until an acidified sample of the reaction mixture is soluble in water. A fulling bath is mixed with about 5 per cent its weight of this product. By treating woollen goods with this fulling bath, even when the solution shows an acid reaction, a good fulling effect, a good protection of the fibre and a good preservation of the color are obtained, even in cases where the goods cannot withstand the ordinary fulling. If there are insoluble impurities to be removed, for example specks of pitch, mineral oil stains and the like, organic solvents are added to the said ingredients, and although the organic solvents are not soluble in water, by stirring with the condensation product beforementioned, either alone or in combination with soaps, they become soluble.

*Example 3*

75 parts of di-ethylene triamine are condensed by heating to about 100° C. with 282 parts of hydroxy-stearic chloride, a condensing agent, such as zinc chloride being added, if desired. 100 parts of the amide are dissolved in 500 parts of ethylene chloride and the solution is introduced at 20° C. while cooling into a mixture of 40 parts of chlorsulphonic acid and 100 parts of ethylene chloride. The reaction mixture is then rendered neutral with aqueous caustic soda whereby a portion of the ethylene chloride separates out. After separating this portion remainders of ethylene chloride are removed from the sulphuric ester of the amide by warming in vacuo. The product obtained can be subjected to a further treatment by introducing alkyl radicles which may also contain hydroxyl groups, into the amine group as for example with dimethyl sulphate in the presence of water or with ethylene oxide at about 150° C. and at superatmospheric pressure. All the products are very suitable for use as wetting or dispersing agents in the textile or rubber industries.

*Example 4*

Equimolecular quantities of tri-ethylene tetramine and monobutyl naphthalene sulphonic acid are heated until complete condensation occurs. The product into which alkyl radicles, which may also contain a hydroxyl group, may be introduced as for example by heating with ethylene oxide up to about 150° C. in a closed vessel, can be advantageously employed, for example in the manufacture of artificial silk as an addition to the spinning baths or as a wetting agent in treating artificial silk with an aqueous bath. The product can be also converted into its salt with the aforesaid or another acid.

*Example 5*

100 parts of tri-ethylene tetramine are mixed with about 105 parts of oleic chloride, whereby the mixture becomes warm. The reaction mixture is then heated to 160° C. until a sample is completely soluble in water.

The product is then converted into its sulphuric ester by introducing a sulphuric acid radicle into the chain of oleic acid by introducing 20 parts of the product into 100 parts of concentrated sulphuric acid while avoiding superheating to temperatures above 20° C. The product may be employed for example as a cleansing or washing agent.

*Example 6*

166 parts of phthalic acid are heated with 75 parts of di-ethylene triamine for several hours at from 160° to 180° C. A yellow colored amide soluble in acids is obtained. The product is then sulphonated by heating it with a 90 per cent sulphuric acid to about 120° C.

By adding from 1 to 2 per cent by weight with reference to the goods to be dyed of the sodium salt of the sulphonic acid instead of sodium sulphate to a dye bath, containing an acid substance, a thorough dyeing and dyeings of good uniformity and fastness to rubbing are obtained with dyestuffs which, otherwise, do not dye evenly.

What we claim is:—

1. The process for the production of wetting, cleansing, dispersing and like agents which comprises condensing an aliphatic poly-amino compound, which contains more than 2 nitrogen atoms and at least one reactive hydrogen atom connected to a nitrogen atom but is free from alkylol groups, with a higher organic acid containing at least one group selected from the class consisting of alkylene and hydroxyl groups, to form an amide therewith, the resulting amide being reacted with a sulphonating agent provided it contains an insufficient number of sulphur-containing groups selected from the class consisting of sulphuric ester and sulphonic acid groups.

2. The process for the production of wetting, cleansing, dispersing and like agents which comprises condensing an aliphatic poly-amino compound, which contains more than 2 nitrogen atoms and at least one reactive hydrogen atom connected to a nitrogen atom that is free from alkylol groups, with an aliphatic carboxylic acid containing at least 6 carbon atoms and at least one group selected from the class consisting of alkylene and hydroxyl groups, to form an amide therewith, the resulting amide being reacted with a sulphonating agent provided it contains an insufficient number of sulphur-containing groups selected from the class consisting of sulphuric ester and sulphonic acid groups.

3. The process for the production of wetting, cleansing, dispersing and like agents which comprises condensing an aliphatic poly-amino compound, which contains more than 2 nitrogen atoms and at least one reactive hydrogen atom connected to a nitrogen atom but is free from alkylol groups, with an aromatic sulphonic acid, to form an amide therewith.

4. An amide, containing a sulphur-containing group selected from the class consisting of sulphuric ester and sulphonic acid groups, of an aliphatic poly-amino compound, which contains more than 2 nitrogen atoms and at least one reactive hydrogen atom connected to a nitrogen atom but is free from alkylol groups, with a higher organic acid containing at least one group selected from the class consisting of alkylene and hydroxyl groups.

5. An amide, containing at least one sulphur-containing group selected from the class consisting of sulphuric ester and sulphonic acid groups, of an aliphatic amine, which contains more than 2 nitrogen atoms and at least one reactive hydrogen atom connected to a nitrogen atom but is free from alkylol groups, with a higher organic acid containing at least one group selected from the class consisting of alkylene and hydroxyl groups.

6. An amide, containing at least one sulphur-containing group selected from the class consisting of sulphuric ester and sulphonic acid groups, of an aliphatic amine, which contains more than 2 nitrogen atoms and at least one reactive hydrogen atom connected to a nitrogen atom but is free from alkylol groups, with an aliphatic carboxylic acid containing at least 6 carbon atoms and at least one group selected from the class consisting of alkylene and hydroxyl groups.

7. An amide, containing at least one sulphur-containing group selected from the class consisting of sulphuric ester and sulphonic acid groups, of an aliphatic amine, which contains more than 2 nitrogen atoms and at least one reactive hydrogen atom connected to a nitrogen atom but is free from alkylol groups, with an aliphatic carboxylic acid of vegetal origin containing at least 6 carbon atoms and at least one group selected from the class consisting of alkylene and hydroxyl groups.

8. A sulphuric ester of an amide from an aliphatic amine, which contains more than 2 nitrogen atoms and at least one reactive hydrogen atom connected to a nitrogen atom but is free from alkylol groups, with an aliphatic carboxylic acid of vegetal origin containing at least 6 carbon atoms and at least one group selected from the class consisting of alkylene and hydroxyl groups.

9. A sulphonic acid of an amide from an aliphatic amine, which contains more than 2 nitrogen atoms and at least one reactive hydrogen atom connected to a nitrogen atom but is free from alkylol groups, with an aliphatic carboxylic acid of vegetal origin containing at least 6 carbon atoms and at least one group selected from the class consisting of alkylene and hydroxyl groups.

10. An amide, containing a sulphur-containing group selected from the class consisting of sulphuric ester and sulphonic acid groups, of an aliphatic amine, which contains more than 2 nitrogen atoms and at least one reactive hydrogen atom connected to a nitrogen atom but is free from alkylol groups, with an aromatic sulphonic acid.

11. An amide, containing a sulphur-containing group selected from the class consisting of sulphuric ester and sulphonic acid groups, of an aliphatic amine, which contains more than 2 nitrogen atoms and at least one reactive hydrogen atom connected to a nitrogen atom but is free from alkylol groups, with a naphthalene sulphonic acid.

12. The carbamide of a polyethylene polyamine and an aliphatic carboxylic acid of vegetal origin containing at least 6 carbon atoms and at least one group selected from the class consisting of alkylene and hydroxyl groups, said acid containing a sulphur-containing group selected from the class consisting of sulphuric ester and sulphonic acid groups.

13. The carbamide of a polyethylene polyamine and an aliphatic carboxylic acid of vegetal origin containing at least 6 carbon atoms and at least one group selected from the class consisting of alkylene and hydroxyl groups, said acid containing a sulphuric ester group.

14. The carbamide of a polyethylene polyamine and an aliphatic carboxylic acid of vegetal origin containing at least 6 carbon atoms and at least one group selected from the class consisting of alkylene and hydroxyl groups, said acid containing a sulphonic acid group.

15. The carbamide of a polyethylene polyamine and oleic acid, said acid containing a sulphur-containing group selected from the class consisting of sulphuric ester and sulphonic acid groups.

16. The carbamide of a polyethylene polyamine and oleic acid, said acid containing a sulphuric ester group.

17. The carbamide of diethylene triamine and an aliphatic carboxylic acid of vegetal origin containing at least 6 carbon atoms and at least one group selected from the class consisting of alkylene and hydroxyl groups, said acid containing a sulphur-containing group selected from the class consisting of sulphuric ester and sulphonic acid groups.

18. The carbamide of diethylene triamine and oleic acid, said acid containing a sulphur-containing group selected from the class consisting of sulphuric ester and sulphonic acid groups.

19. The carbamide of diethylene triamine and oleic acid, said acid containing a sulphonic acid group.

HEINRICH ULRICH.
JOSEPH NUESSLEIN.